UNITED STATES PATENT OFFICE.

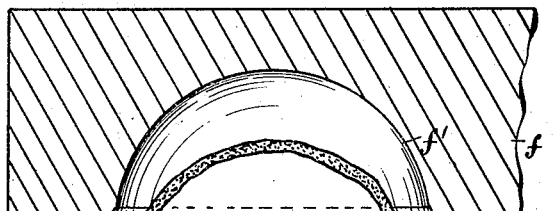
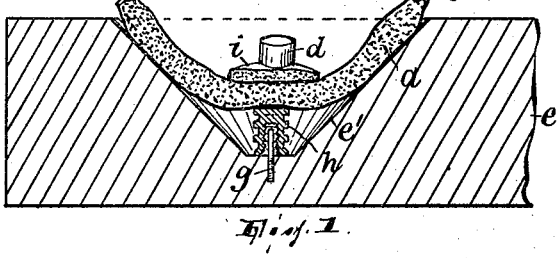
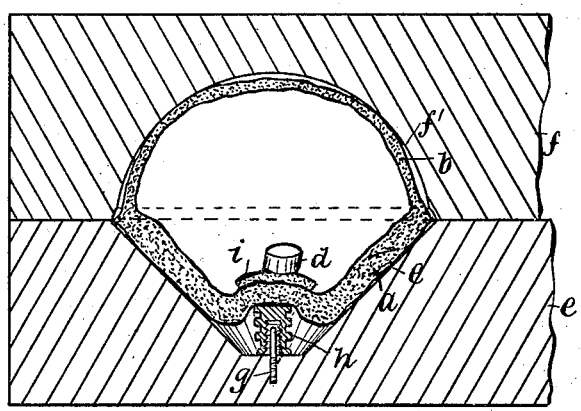
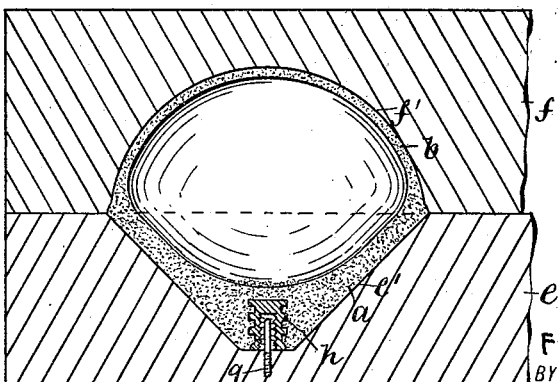

FRANK A. CIGOL, OF PATERSON, NEW JERSEY.

METHOD OF FORMING HOLLOW RUBBER ARTICLES.

1,378,523.

Specification of Letters Patent. Patented May 17, 1921.

Application filed July 31, 1920. Serial No. 400,318.

*To all whom it may concern:*

Be it known that I, FRANK A. CIGOL, a citizen of the United States, residing at Paterson, in the county of Passaic and State of New Jersey, have invented certain new and useful Improvements in Methods of Forming Hollow Rubber Articles, of which the following is a specification.

The object of this invention is to simplify and cheapen the method of manufacturing hollow rubber valves or any other hollow article of rubber having an insert, as an attaching screw plug, embedded therein.

According to this invention, having formed a whole hollow body of rubber, as by forming two rubber sheet pieces each concavo-convex and then edge-joining them by a marginal pressure operation and so that the resulting whole hollow body will immure or entrap a gas-forming substance, one of such pieces being preferably thicker than the other and treated so as to cure harder than the other (since it is to have embedded therein the aforesaid insert and should therefore be a more substantial structure than the other in the final product), the said hollow body is placed in a closed mold together with the said insert, and then the mold is subjected to vulcanizing or curing heat, whereby during the vulcanizing of the rubber the gas generated by the heat from the gas-forming substance causes the hollow body to expand in the mold until the insert becomes embedded therein. In practice, where as preferred one of the two initial rubber pieces is thicker and adapted to cure harder than the other, it is the part of the whole hollow body represented by such piece which is presented to the insert when they are placed in the mold. Having formed the whole hollow body with the gas-forming substance within the same, according to my invention there is then only one other step to perform, viz, the curing of such body in the mold with the insert also present therein.

In the accompanying drawing, which fully illustrates my improved method,

Figure 1 shows the whole hollow rubber body, after being formed from halves or in any other way, and the insert in the lower half-cavity of a mold, the upper member of which is withdrawn;

Fig. 2 shows the same parts after the upper member of the mold has been brought face to face with the lower member thereof; and Fig. 3 shows the same parts after the curing has been effected.

*a* and *b* designate the two concavo-convex halves which are edge-joined in some suitable way, as at *c*. The half *a* is preferably thicker than the other half and has been already treated so that it will cure harder than the other half, the object of which has been already indicated. Contained in this hollow body is a gas-forming substance *d*. Since the ultimate product usually has the heavier or thicker half thereof, as *a*, frusto-conical, and the other half, as *b*, hemispherical, in forming each of the halves they are made as near as possible to simulate these shapes. *e* and *f* designate the upper and lower members of a curing or vulcanizing mold, the former having a frusto-conical recess *e'* and the latter a hemispherical recess *f'*, adapted to register with each other when the mold members are brought together, as in Fig. 2. In mold member *e*, axially of its recess *e'*, is a fixed stud *g* on which is adapted to be placed the aforesaid insert in the form of a screw plug *h* whose threaded bore receives the stud *g*.

The insert *h* having been positioned in this way in the recess *e'*, the hollow body *b* is placed in the recess with the half *a* thereof down. In this the recess *e'*, since the half *a* has been made to conform generally to its shape (frusto-conical), assists in the proper positioning of the hollow body with reference to the insert; in other words, the relative positioning of the hollow body and insert is done in and with the assistance of the mold recess. Thereupon the upper mold member *f* with its recess *f'* in registry with recess *e'*, is placed on mold member *e*, as in Fig. 2, and the assembled mold members are placed in the vulcanizer. The vulcanizing heat, while curing or vulcanizing the hollow rubber body, also generates gas from the substance *d* and this in expanding causes the heat-softened rubber of said body to flow down around the insert *h* while the general expansion of said body to the form of the mold is taking place. The resultant product is show in the mold in Fig. 3.

It has been proposed to make hollow rubber articles having embedded inserts by first forming the halves, then forcing one of the halves into a mold cavity having the insert removably arranged on a pin therein and until the material of said half flows around and so embeds the insert, then edge-joining the halves and then vulcanizing them in a mold in one-half of which there is a pin on which to fit the insert. But since the material is uncured at the time the insert is embedded and the halves are joined, the half having the insert embedded therein changes its shape (tends to flatten or become shallower) as soon as it leaves the first mold cavity, so that when it is entered into the vulcanizing mold the embedded insert can only be fitted to the pin therein with the greatest difficulty. My method avoids this difficulty, since the embedding of the insert and the vulcanizing occur substantially at the same time on the already whole hollow object.

It is best to provide increased thickness where the insert $h$ is to be embedded, and to this end I preferably cement a pad $i$ of rubber to the half $a$ before joining the halves $a$ $b$.

Having thus fully described my invention, what I claim as new and desire to secure by Letters Patent is:—

1. The method of forming a hollow rubber article having a relatively infusible insert embedded therein which consists in first forming a closed hollow rubber body and in the forming thereof immuring therein a gas-forming substance, then placing said hollow body and the naked insert in a closed mold detached from each other and then subjecting the mold to vulcanizing heat until the gas generated from said substance by the heat expands and fuses said body in the mold and causes the material thereof to flow over the surface of and thus come to embed the insert therein, 2. The method of forming a hollow rubber article having an insert embedded therein which consists in first forming a closed hollow rubber body and in the forming thereof immuring therein a gas-forming substance, then placing the insert in a mold recess, thereafter placing said body in the mold recess and utilizing the latter to position said body relatively to the insert, then closing the mold, and finally subjecting the mold to vulcanizing heat until the gas generated from said substance by the heat expands said body in the mold and causes the insert to become embedded in the material of said body.

In testimony whereof I affix my signature.

FRANK A. CIGOL.